United States Patent [19]

Beer

[11] Patent Number: 4,828,854
[45] Date of Patent: May 9, 1989

[54] SHAPED BODY OF A CONFECTION PRODUCT

[75] Inventor: Richard Beer, Nuremberg, Fed. Rep. of Germany

[73] Assignee: Schöller Lebensmittel GmbH & Co. KG, Nuremberg, Fed. Rep. of Germany

[21] Appl. No.: 25,483

[22] Filed: Mar. 13, 1987

[30] Foreign Application Priority Data

Mar. 14, 1986 [DE] Fed. Rep. of Germany ....... 3608623

[51] Int. Cl.$^4$ .............................................. A23G 9/00
[52] U.S. Cl. ..................................... 426/104; 62/322; 425/199; 426/565; 426/516
[58] Field of Search ............... 426/565, 566, 567, 249, 426/660, 572, 576, 514, 517; 62/332; 425/199

[56] References Cited

U.S. PATENT DOCUMENTS

| | | | |
|---|---|---|---|
| 790,920 | 5/1905 | Richards | 426/660 |
| 921,052 | 5/1909 | Yacoobian | 426/660 |
| 2,879,163 | 3/1959 | Anson et al. | 426/517 |
| 3,958,018 | 5/1976 | Tay | 426/660 |
| 3,974,300 | 8/1976 | Roberts | 426/565 |
| 4,020,643 | 5/1977 | Roberts | 426/565 |
| 4,357,359 | 11/1982 | Cloud et al. | 426/660 |
| 4,504,511 | 3/1985 | Binley | 426/565 |
| 4,542,028 | 9/1985 | Butcher et al. | 426/565 |

FOREIGN PATENT DOCUMENTS

| | | |
|---|---|---|
| 1219593 | 4/1968 | United Kingdom . |
| 1439143 | 6/1972 | United Kingdom . |
| 2108363 | 8/1982 | United Kingdom . |

*Primary Examiner*—Jeanette Hunter
*Attorney, Agent, or Firm*—Scully, Scott, Murphy & Presser

[57] ABSTRACT

A shaped body of ice cream built up of layers is described. The individual layers (3) of ice cream consist of extruded strands (2) that are laid down in the form of curves, for example an eight, beside and on top of one another.

Further, an apparatus for preparing such shaped bodies is described wherein a plurality of nozzles are arranged side by side and with the outlets underneath in a moveably mounted support plate. The supply side of each nozzle is connected via a supply line with a distributor head and the support plate is moved in curves by means of a mechanism. A moveable substrate for the extrudate, for example a conveyor belt or a tray, is arranged underneath the nozzles.

8 Claims, 2 Drawing Sheets

SHAPED BODY OF A CONFECTION PRODUCT

TECHNICAL FIELD OF THE INVENTION

The invention relates to a shaped body of a confection product consisting of a plurality of superimposed layers formed from extruded strands of confection, in particular ice cream, of which at least one is in the form of a wave and may overlap itself, according to the preamble of claim 1 or 2, and to apparatus for the production of the shaped body.

BACKGROUND OF THE INVENTION

Ice cream products of this form and construction have recently become known and enjoy increasing popularity. The attraction of these products is the alternating arrangement of layers of ice cream and the thin separating layers that may be present and can consist of the most varied substances, for example chocolate, fruit cocktail or wafer biscuits. Furthermore the ice cream layers can be made light and creamy by the said folding or by beating air into them, so that the whole provides a very varied product that is refreshing and not too cold to the tongue.

Such ice cream products (frozen confection products) are described for example in British specification Nos. 1 219 593 and 1 439 143. They exhibit a plurality of superimposed extruded layers of an aerated frozen confection material with a layer of a second confection material or wafer biscuit arranged between each pair of adjacent layers of the frozen confection material. As a departure from the subject matter of the British specifications gas-free material of suitable composition can also be used instead of aerated frozen confection material.

Obviously in order to reduce the sensation of cold during the consumption of such a product, and to provide a product with a novel texture and structure, a frozen confection product of the above-mentioned kind is proposed in British Pat. No. 2 108 363 that has at least four extruded layers each less than 5 mm thick, with the intermediate layers between the said extruded layers being relatively thin. Reducing the thickness of the extruded layers, that is to say the ice cream layers proper, gives the product an overall laminated appearance.

When, as described in said British patent, the extruded layers of ice cream, or at least one ice cream layer, is or are applied as a flat strip in the form of a wave that may optionally overlap with itself, additional spaces are created. These however, by virtue of their situation at the upper and lower boundary surfaces of the confection layer at which they are open, make said intermediate layer an essential requirement for the stability of the product as a whole.

OBJECT OF THE INVENTION

The object of the invention is further to develop layered frozen confection products of the kind described so as to heighten the loose, airy impression when the products are consumed, to make it unnecessary to use aerated varieties of ice cream, that is to say so-called soft ice cream, in building up the products, and in particular to create spaces without having to provide stabilizing intermediate layers.

SUMMARY OF THE INVENTION

According to a first solution of this problem a shaped body is prepared in which the ice cream layer consists of extruded strands, the strands are laid down as loops in the form of regular or irregular arcs extending in the plane of each layer of confection, and the loop-shaped arcs of the strands are disposed in superimposed layers of confection so that they overlap. The strands can basically be of any desired cross-section, but advantageously they have a round, oval, triangular, rectangular or star-shaped cross-section. By laying down the strands ornamentally spaces are simultaneously created, and laying down the strands in adjacent superimposed confection layers so as to overlap ensures a stable arrangement of the layers relative to one another without a stabilizing intermediate layer.

According to a second solution of this problem the ice cream layers likewise consist of extruded strands, the strands being laid down so as to overlap one another in the form of a FIG. 8 or in the form of circles or ovals that extend in the plane of each confection layer. The overlapping strands within each confection layer ensure that each individual layer is intrinsically so stable that the multiple layers of the shaped body can be laid down on top of one another without the strands of adjacent layers having to overlap or intermediate layers having to be provided.

When the above-mentioned conditions are fulfilled it is possible, without the need for other measures, to make the extruded strands of ice cream thicker than 5 mm, for example to select strand diameters of 6 or 8 mm. Despite the spaces that are created the product thus takes on a more compact overall appearance without losing the above-mentioned advantages. It is also possible to form the extruded strands of ice cream as described from dairy ice cream, water ice or varieties of dairy ice cream that have been deliberately enriched in air by beating.

Suitable embodiments of the invention contribute to the production of a markedly improved and more advanced end product that imposes particularly little burden on the tongue and stomach because of its relatively high content of non-ice-cream materials.

For the preparation of the proposed shaped bodies an apparatus is provided in which a plurality of nozzles are arranged alongside one another on a moveably mounted support plate with their outlet openings downwards. The inlet sides of these nozzles are each connected via a supply line to a distribution head, and the support plate can be moved in a curving manner by a mechanism. A moveable substrate for the extrudate is arranged beneath the nozzles.

If the shaped body is to consist of a single continuously laid down strand, only a single nozzle is provided in the said apparatus, and this may if desired be adjustable vertically away from the substrate so as to adapt to the increasing height of the shaped body.

With an apparatus of this kind the proposed shaped bodies can be economically and quickly prepared. Usually, pre-frozen ice cream at a temperature of for example $-5°$ to $-10°$ C. is supplied to the nozzles. A suitable tray of cardboard, plastic material, biscuit or the like may serve as the substrate. The nozzles are moved by means of the said mechanism for example in the form of a figure eight, so that a first layer of ice cream extrudate is laid down on the substrate. The substrate is then advanced stepwise and a second nozzle arrangement is brought into use. While said nozzle arrangement is applying the second strand-like extrudate layer a fresh substrate plate is moved beneath the first nozzle arrangement and the process is started up there anew. In this way, with a production line that can be extended at will, a multilayer shaped body, for example with 6 or 8 layers, can be quickly and economically produced as desired. The finished composite product is then moved into a cooling tunnel (hardening apparatus) and cooled to the storage temperature of about −20° or −30° C.

In a modified design of apparatus a plurality of nozzles is likewise arranged side by side on a moveably mounted support plate. This plate also is moved by a suitable mechanism, for example in a figure-eight or oval (elliptical) locus, so as to lay down a first layer of a strand-shaped extrudate on a substrate plate. After completion of this layer the substrate plate is not advanced but extrusion is begun, from the same nozzles, of a second layer that is laid down on the first one. The device can be so constructed that the nozzle plate is raised from layer to layer: this can also be effected through the control mechanism.

In a further arrangement of the apparatus, particularly for the production of shaped bodies in which the fatty layers of the confection product consist of a plurality of strands, optionally also of different compositions, and in which the shaped body is formed as an endless length and is cut into lengths to form the desired separate shaped bodies, a plurality of nozzles are arranged at substantially the height of the confection layer to be formed and vertically spaced relative to one another above a conveyor belt that serves as substrate and can be moved at constant speed. The nozzles can be controllably moved horizontally over the conveyor belt by means of a mechanism, and a cutting device is provided for cutting the shaped body pieces into lengths.

BRIEF DESCRIPTION OF THE DRAWINGS

The invention will now be explained in more detail with reference to the accompanying drawings, in which.

DETAILED DESCRIPTION OF PREFERRED EMBODIMENTS OF THE INVENTION

Figure 1:
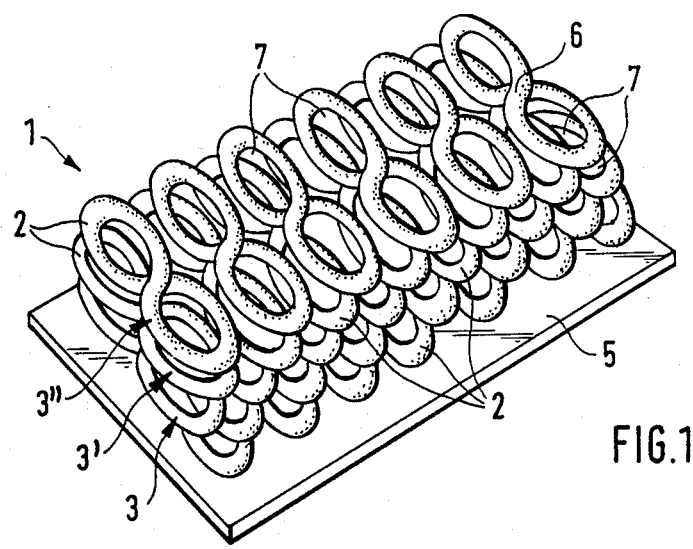
FIG. 1 shows a perspective view of one embodiment of a shaped body of ice cream.

The shaped body shown in FIG. 1 is indicated generally by (1). It consists of extruded strands of ice cream (2) that have been laid down in the form of curves side by side and superimposed. In this way layers (3, 3', 3'') are formed which together make up the shaped body.

The shaped body as a whole, and hence the lower layer (3), is laid down on a substrate (5) consisting of cardboard, plastic material, biscuit or the like.

Figure 2:
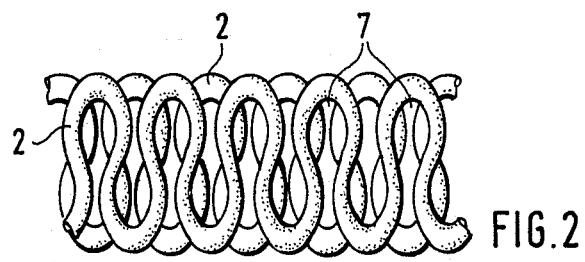
FIG. 2 shows a partial plan view of ice cream strands that have been laid down alongside one another in the form of curves.

In the embodiments shown by way of example in FIGS. 1 and 2 the strands (2) are round in section. However, instead of this, any other desired cross-section could be chosen. Round, oval, triangular, rectangular or star-shaped sections are preferred.

It has been found particularly advantageous for the strand (2) to be laid down in the form of an 8, as shown in FIG. 1. In this case the strands cross in the middle at (6), so that the shaped body is higher at that point than at the sides. In practical embodiments the resulting peaks are crowned by a spot of differently colored ice cream, cream or the like.

Figure 3:
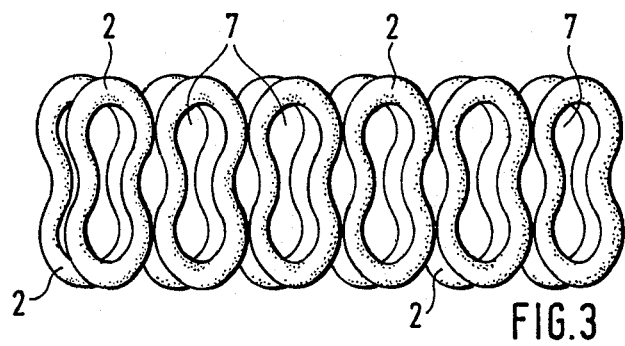
FIG. 3 shows a second embodiment consisting of pieces of strands laid down as closed loops.

The extruded strands of ice cream can be laid down in shapes other than the FIG. 8, e.g. in the form of overlapping rings or ovals, or in the form shown in FIGS. 2 and 3. In this case the result is a structure that is heavily interspersed with spaces and is loose and airy and exhibits the above-mentioned properties. The spaces (7) in this structure can in addition be filled with couvertures, chocolate, nougat, nuts, almonds, fruit or the like.

Figure 4:
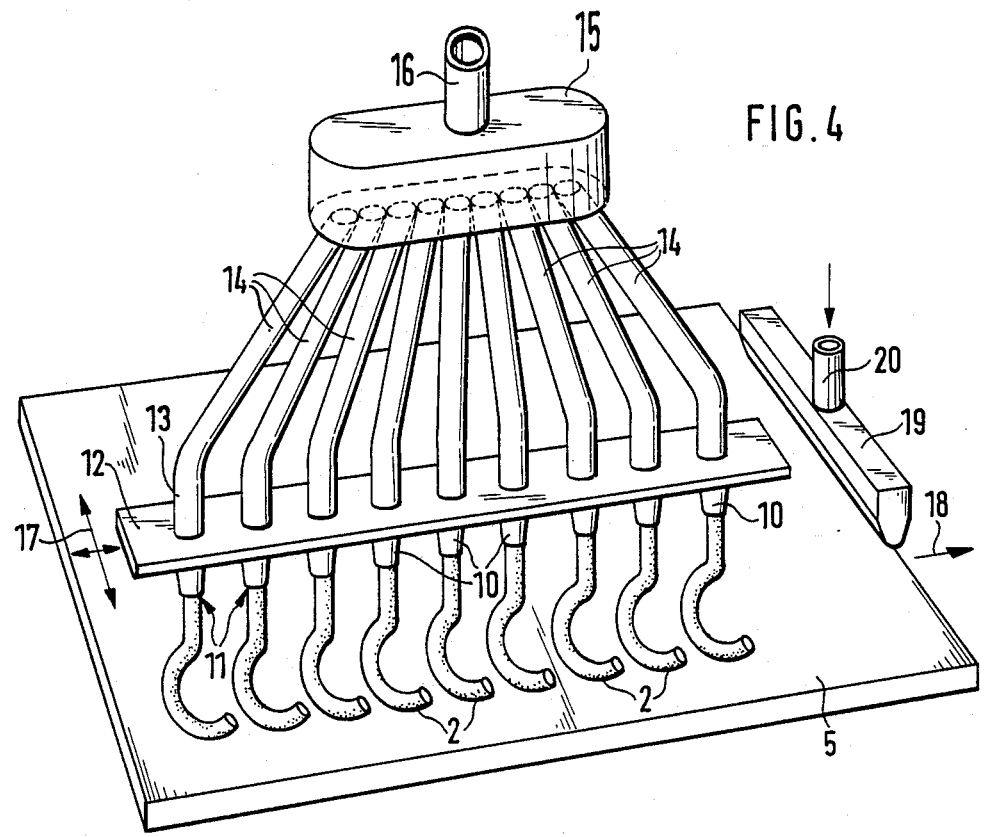
FIG. 4 shows a simplified perspective view of a device for preparing shaped bodies of ice cream.

In FIG. 4 an apparatus for preparing a shaped body of ice cream is shown. The apparatus consists of a plurality of nozzles (10) arranged side by side and with the outlet openings (11) underneath, on a moveably mounted support plate (12). The inlet supply side (13) of each of the nozzles (10) is connected via a supply line (14) (for example a hosepipe) to a distributor head (15). The distributor head (15) has a main supply line (16) which in turn is connected directly to a pressurised ice cream delivery store, for example an extruder. The support plate (12) can be moved by means of a mechanism (not shown) along a curve, with the direction and amplitude of the movement following the shape of the curve desired to be laid down. The movements are indicated in FIG. 4 by the arrows (17). Beneath the nozzles (10) is the moveable substrate (5) which has already been mentioned.

To operate the apparatus ice cream under pressure is delivered to the main supply line (16). This ice cream is distributed via the distributor head (15) and the lines (14) to the nozzles. As a result of the movement of these nozzles the strands of ice cream (2) issuing from the nozzles are laid down in the form of curves on the substrate (5), as indicated in FIG. 4.

When a complete pattern that forms a layer has been laid down the nozzles are closed so that no further ice cream can issue. The substrate (5) is then advanced in the direction of the arrow (18), thus moving the ice cream strand patterns that have been laid down past and beneath the wide slit nozzle (19). Separating layer material, for example chocolate couvertures, nougat, or the like is supplied to this nozzle via the supply line (20) and is distributed as a thin layer over the patterns laid down.

As soon as the forward movement of the substrate (5) ceases, the supply of couverture to the wide slit nozzle (19) is turned off and a new deposit is supplied to the nozzles (10) (or to the whole apparatus associated therewith) for the working cycle shown to be repeated. The substrate already provided with a layer of strand is passed to a second apparatus that is similar to the first one and has the object of applying a second strand layer of ice cream. The plant thus consists of a plurality of extrusion stations, eight of which are needed if eight-layered shaped bodies are to be formed. At the end of the machine line a further nozzle device may be provided for the purpose of forming a final crown of couverture or cream on the structure produced.

As already mentioned, the shaped bodies produced in such a line are then moved into a hardening tunnel (deep-freezing tunnel) where they are rapidly shock-cooled to storage temperatures of about −30° C.

Figure 5:
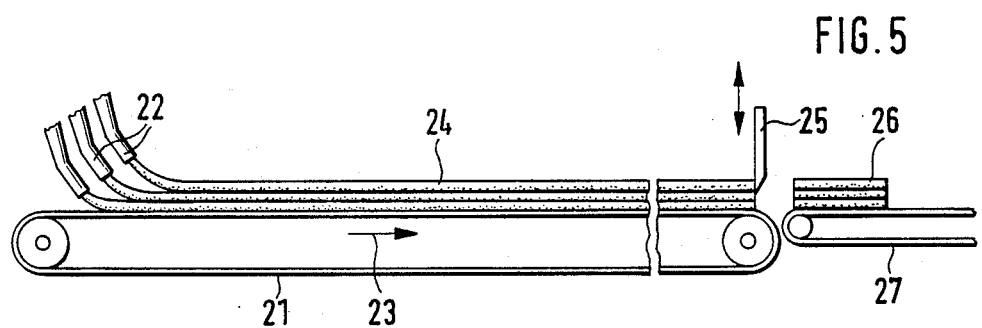
FIG. 5 is a diagrammatic side view of an apparatus for preparing a shaped body as a strand that is to be cut into lengths.

In the apparatus according to FIG. 5 the confection layers are laid down on a conveyor belt (21) at the front end of which a plurality of nozzles (22) (in this case, for example, three) are arranged spaced vertically relative to one another, said nozzles being connected with a device (not shown) for supplying ice cream and being controlled by a mechanism (also not shown) to move transversely to the direction of movement of the conveyor belt indicated by the arrow (23). The resulting strand of shaped body (24), indicated diagrammatically, can be cut to lengths at the end of the belt (21) by a cutting device arranged there that can be moved up and down, so that pieces of shaped body (26) result that can be taken away by a further conveyor belt (27).

We claim:

1. A shaped body of an ice cream product consisting of a plurality of superimposed ice cream layers formed from extruded strands, at least one of said layers being wave-shaped and self-overlapping, wherein the strands have a round, oval, triangular, rectangular or star-shaped cross-section; the strands are laid down as loops in the form of regular or irregular arcs extending in the plane of each ice cream layer; and the looped arcs of the strands in superimposed ice cream layers are laid down so as to intersect one another such that air gaps exist between the layers and the individual strands of ice cream.

2. A shaped body of an ice cream product consisting of a plurality of superimposed ice cream layers formed from extruded strands, at least one of said layers being wave-shaped and self-overlapping, wherein the strands have a round, oval, triangular, rectangular or star-shaped cross-section and the strands are laid down so as to overlap one another, in the form of an eight or of circles or ovals that extend in the plane of each ice cream layer such that air gaps exist between the layers and the individual strands of ice cream.

3. A shaped body according to claim 1, wherein the ice cream layers of the said ice cream product are formed from a single strand that is laid down continuously.

4. A shaped body according to claim 1, wherein ice cream layers of the ice cream product consist of different strands, which may be of different kinds of ice cream.

5. A shaped body according to claim 1, wherein each ice cream layer of the ice cream product is made up of several strand pieces lying alongside one another in the plane of the layer.

6. A shaped body according the claim 4, wherein the shaped body is prepared as an endless strand of shaped body and is cut up into shaped body pieces of the desired length.

7. A shaped body according to claim 1, wherein the spaces formed by the strands or pieces thereof are wholly or partly filled with couvertures, pieces of chocolate, nuts, fruit or the like.

8. A shaped body according to claim 1, wherein a strand of confection material such as couverture, cocoa glaze or nougat, is arranged parallel to and adjacent each of said strands or strand pieces.

* * * * *